No. 805,482. PATENTED NOV. 28, 1905.
P. S. McCROSKEY.
COMPUTING CHEESE CUTTER.
APPLICATION FILED DEC. 22, 1904.
2 SHEETS—SHEET 1.
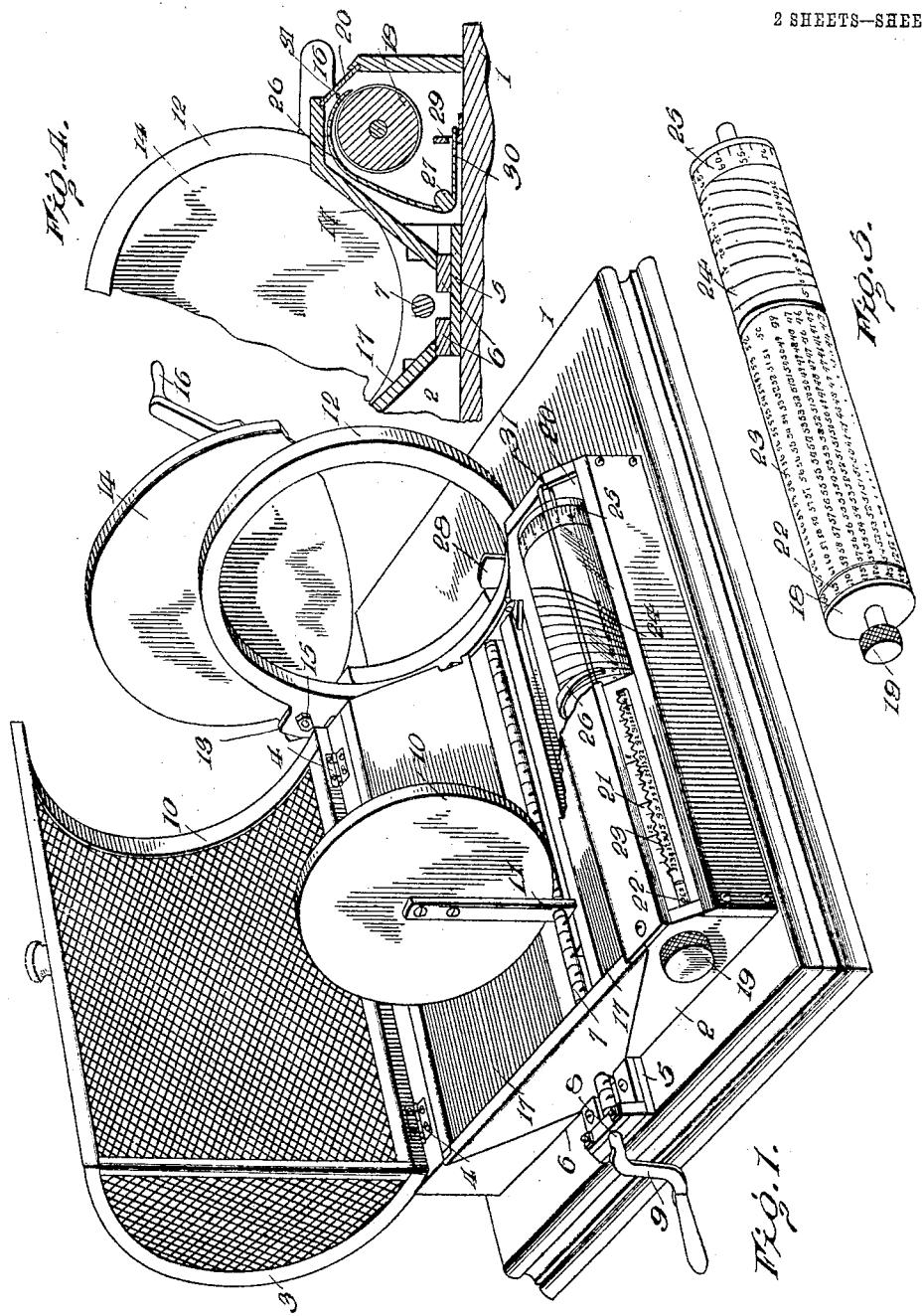
Witnesses
Inventor
P. S. McCroskey.
By
Attorneys No. 805,482. PATENTED NOV. 28, 1905.
P. S. McCROSKEY.
COMPUTING CHEESE CUTTER.
APPLICATION FILED DEC. 22, 1904.
2 SHEETS—SHEET 2.
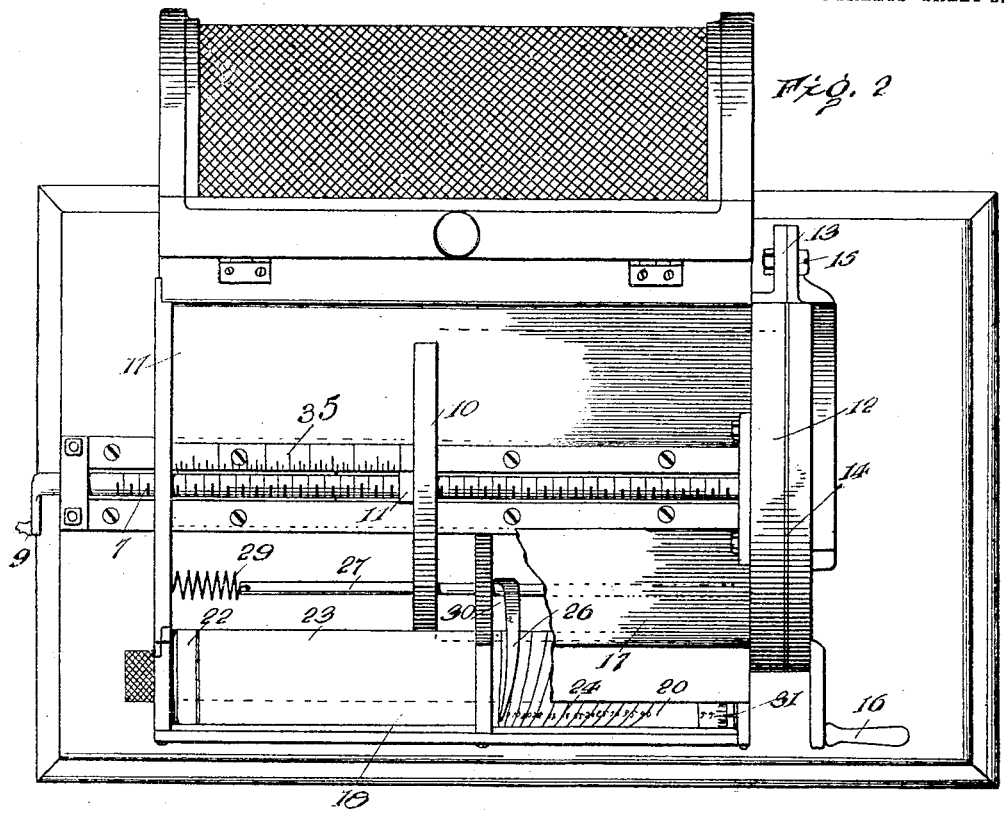
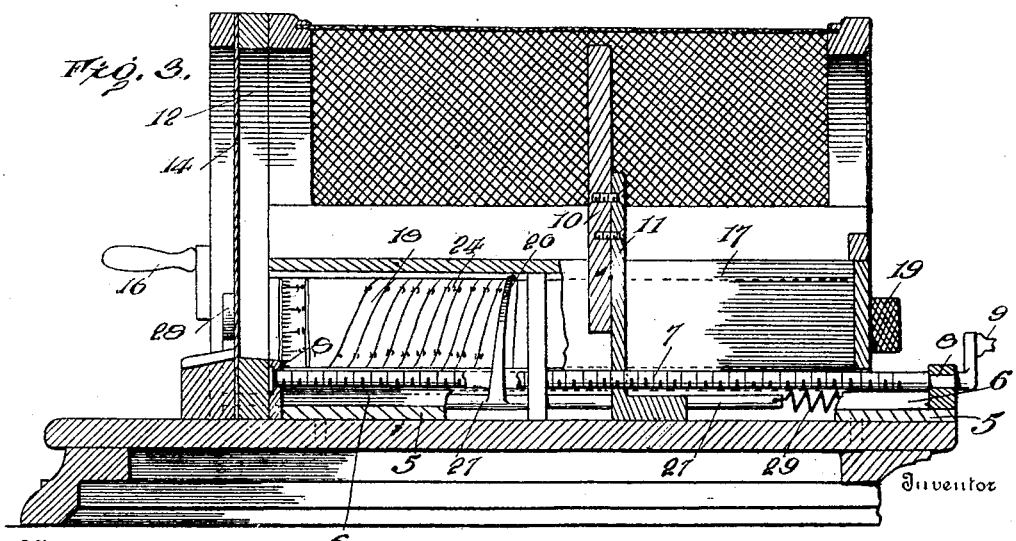

UNITED STATES PATENT OFFICE.

PHILIP S. McCROSKEY, OF MARVIN, KANSAS.

COMPUTING CHEESE-CUTTER.

No. 805,482.     Specification of Letters Patent.     Patented Nov. 28, 1905.

Application filed December 22, 1904. Serial No. 237,973.

*To all whom it may concern:*

Be it known that I, PHILIP S. McCROSKEY, a citizen of the United States, residing at Marvin, in the county of Phillips and State of Kansas, have invented certain new and useful Improvements in Computing Cheese-Cutters, of which the following is a specification.

This invention relates to machines for cutting cheeses or the like, and is especially designed for use in stores to facilitate the sale of the goods. For this purpose the machine embodying the invention comprises in its organization suitable cutting mechanism for cutting the cheese into slices of a predetermined size and value, and computation means whereby the exact size of a portion severed from the body of the cheese may be regulated and varied in order to represent a part of a value proportionate to the value of the whole cheese in the same ratio as is the size of such part to the entire bulk or size of the cheese.

From the foregoing, therefore, it will be noted that on demand for a certain amount of cheese, say, of an ascertained value it is only necessary to quickly adjust the computation devices, whereupon the position of the cutter in order to sever the requisite weight of goods is determined, operation of said cutter accomplishing the above accurately. Trial weight of the goods upon balance-scales, giving rise to delay and often actual loss of material, is thus done away with, with important resultant advantages.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a perspective view of a cheese-cutter embodying the invention, the cover being thrown up. Fig. 2 is a plan view of the invention. Fig. 3 is a vertical longitudinal sectional view. Fig. 4 is a vertical transverse sectional view, the rear portion of the view being broken away. Fig. 5 is a detail perspective view of the computing device.

Corresponding and like parts are referred to in the following description and indicated in all the views of the drawings by the same reference characters.

The invention embodies, essentially, a bed or base 1, upon which is located a suitable casing 2, adapted to receive the cheese to be operated upon. The casing 2 is preferably provided with a cover 3, hinged thereto, as shown at 4, said cover being of semicircular form to conform somewhat with the shape of the cheese within the holder 2. In the bottom of the casing 2 is secured a plate 5, arranged longitudinally thereof and provided upon its upper side with spaced guides 6. A feeding-screw 7 is suitably mounted in bearings 8 at opposite extremities of the casing 2, and this screw 7 is provided at one end with a crank-handle 9, by which it may be operated. A follower 10 is carried by the standard 11, the lower end of which receives the feed-screw 7, so that movement of the screw will impart a longitudinal movement to the part 10, which latter bears against the cheese in the casing 2. At the end of the casing 2 opposite that adjacent which the handle 9 of the feed-screw 7 is located and suitably attached to said casing is a circular frame 12, having a lug 13 projected therefrom at one side, which frame forms a support for the cutter 14, which operates against the outer side thereof. The cutter 14 may be of any suitable type and is pivoted to the lug 13 of the frame 12, as shown at 15, being also provided with a suitable handle 16, by which it may be actuated. The side walls 17 of the casing 2 diverge toward the upper portions thereof, as shown most clearly in Fig. 4, and the cheese when in position is received snugly in a chamber formed by the casing 2 and its cover 3.

The computing means forming a part of this invention is used in the cutting mechanism above generally described, and the computing device preferably comprises a roller 18, journaled in the ends of the casing 2 and arranged longitudinally of said casing and spaced from the adjacent side walls 17 thereof. The roller 18 is inclosed by portions of the casing, as shown in Fig. 4, and one of the journals of the roller is extended through an end of the casing 2 and provided with a suitable handle 19, by which it may be manipulated or revolved. The roller 18 is provided upon its outer or peripheral surface with a number of computing-scales, and the casing 2 is provided with a transparent plate 20 longitudinally thereof, which exposes a certain portion of the roller throughout its entire length. The transparent plate 20 is preferably glass, as usual, and beneath said plate 20 and extending approximately half the length of the roller 18 from the end of the casing 2 adjacent the handle 19 is a measuring-plate 21. The plate 21 is slotted lengthwise thereof in order to expose certain of the scale-marks upon the roller 18 aforesaid.

The several computing-scales provided upon the roller 18 are designed to enable the operator to quickly calculate the size of a slice of cheese of an ascertained value without necessitating the usual operation of weighing. At the extremity of the roller adjacent the handle 19 is provided a gross-value scale 22 entirely surrounding the roller 18 and represents the gross value of cheeses of different sizes. The marks of the scale 22, for instance, represent values from one dollar up to two dollars and sixty-five cents or any other suitable maximum found necessary in the practical adaptation of the invention. Each of the marks increases five cents in value as the scale extends around the roller 18, as indicated most clearly in Fig. 5 of the drawings.

The measuring-plate 21, above described, is provided with marks indicating inches and designed to give the length of the cheese which may be disposed in the casing 2, in order that the size of individual parts of the cheese of ascertained values may be determined. Each of the gross-value marks of the gross-value scale 22 is provided with a division-scale 23, by which is indicated the number of parts into which the cheese must be cut in order to vend a portion of the cheese of a size in the same ratio to the whole cheese that the cost of the part severed from the body of said cheese is to the gross value of the cheese. The division-marks of the division-scale 23 extend in line with the gross-value marks with which they are used, and a single gross-value mark of the scale 22, together with its line of division-marks of the scale 23, is exposed by the slot in the measuring-plate 21. The length of the cheese may be clearly noted by reference to a measuring-scale 35, provided upon one of the spaced guides 6, and this scale corresponds with the similar measuring-scale upon the plate 21. The length of the cheese indicated upon the plate 21 will be a certain number of inches, and the mark indicating said length will correspond to or be located adjacent one of the marks of the division-scale 23. The mark of the division-scale 23 adjacent the mark indicating the exact length of the cheese will give the number of slices in which the cheese must be separated or divided in order to provide a part of the ascertained value—say five cents' worth. In order that the value of an ascertained divisional part and the exact size of such part may be determined, a third scale, which may be called a "divisional-value" scale 24, is used. This scale 24 consists of a number of spiral lines which extend around the roller, the space between the lines gradually increasing toward corresponding terminals thereof. The lines of the scale 24 are provided with marks indicating values of divisional parts, said marks in this instance representing five cents' worth as a minimum and increasing by multiples of five. The ratio of increase of the space between the lines of the scale 24 is in proportion to the ratio of decrease in the gross-value marks of the scale 22. In other words, an indicator is used to coöperate with the scale 24, so as to determine the size of the part to be severed from the body of the cheese, and when the gross value of the cheese is comparatively low—for instance, one dollar—the distance between the marks of the scale 24 will be greater than when the gross value of the cheese is two dollars or more, for the reason that the greater the gross value the smaller is the size of the slice which will be vended for the same amount of money. The division-scale 22 comprises an arbitrary arrangement of marks selected with reference to the measuring-scale 21, and in order to set the divisional-value scale 24 in proper relation to the indicator, to be hereinafter described, an adjusting-scale 25 is utilized. This scale 25 extends around the roller 18 in a similar manner as the scale 22 is located and is provided with marks corresponding with the marks of the division-scale 23, and, as represented, the minimum division-mark of the scale 23 will be the same as that of the adjusting-scale 25 for all practical purposes, and the maximum marks will likewise be equal.

As mentioned before, an indicator coöperates with the division-value scale 24, and this indicator comprises a pointer 26, projected from a spring-actuated rod 27, mounted just below the roller 18 at one side thereof. The rod 27 projects out of the casing 2 adjacent the frame 12 of the cutting mechanism, and the outer extremity thereof is provided with a gage-plate 28, against which the cheese or material being operated upon bears as it is fed through the frame 12 preparatory to being severed or sliced by the cutter 14. A spring 29 at the inner extremity of the rod 27 coöperates with this rod to normally hold the plate 28 against the side of the frame 12, so that said plate will be properly actuated as the material is fed through the frame 12 in the cutting operation. Movement of the gage 28 will impart a like movement to the pointer 26, which coöperates with the scale 24, and such pointer will then indicate just the distance which it is necessary to move the cheese in order that a slice of the requisite value, determinable by the division-value marks of said scale 24, will be cut by operating the cutter 14. A guide-plate 29 is mounted beneath the roller and is longitudinally slotted to receive a projection 30, extending from the rod 27, the movement of the rod being thus accurately guided and the pointer or indicator member 26 held in proper relation to the division-value scale 24. A stationary pointer 31 projects from the inner side of the end of the casing 2 adjacent the adjusting-scale 25, and this pointer coöperates with the scale 25 in order that the roller may be positioned properly in adjusting the same, so that the indicating-pointer 26 will coöperate with the division-value marks at the proper point in the length of said marks, thereby insuring an accurate weight of cheese being vended for the correct value thereof.

Describing the operation of the device hereinbefore set forth, the cheese having been disposed in the casing 2 and the gross weight of the same ascertained previously the gross value of the cheese is then determined. For instance, if the cheese weighs ten pounds and it is desired to sell the same at twenty cents per pound it will be noted that in this instance the gross value will be two dollars. The roller 18 is now operated by the handle 19, so as to bring the gross-value mark "$2.00" in view at the slot in the measuring-plate 21. The length of the cheese is now noted upon the scale 35 and that of the plate 21, and we will say that this length is indicated at eleven inches. The mark "11" upon the plate 21 may be adjacent the division-scale mark "44," whereupon the roller 18 is again adjusted so that the mark "44" of the adjusting-scale 25 will be under the pointer 31. The roller 18 has now been adjusted so as to cause the indicating-pointer 26 to coöperate with the marks of the divisional-value scale 24 at that point in the length of these marks which gives the width of the part which must be severed from the body of the cheese in order to represent a value of five cents or a multiple thereof, as clearly indicated upon said marks at intervals in their length. Thus as soon as the roller 18 has been so adjusted the crank-handle 9 of the screw 7 is operated and the follower 11 moved so as to feed the cheese through the frame 12 of the cutter. The cheese bearing against the gage 28 in this movement will actuate the pointer 26, and when said pointer reaches the first of the division-value marks the cutter 14 may be operated and a slice equivalent to five cents' worth will be cut from the cheese. If the purchaser desires twenty-five cents' worth, the feed-screw 7 will be caused to feed the cheese against the gage 28 until the indicator 26 reaches the fifth of the division-value marks of the scale 24, whereupon actuation of the indicator 14 will separate a portion of the cheese equal to twenty-five cents' worth. The divisional-value marks of the scale 24 are spaced in proportion to the entire length of the cheese in the same ratio as the amount indicated at each of said marks is to the gross value of the material operated upon.

Having thus described the invention, what is claimed as new is—

1. In a cheese-cutter, the combination of cutting mechanism embodying a cutter, a computing device consisting of a gross-value scale, a division-scale, a cheese-measuring scale associated with the division-scale, a divisional-value scale, an indicator coöperating with the divisional-value scale, and means determined by the relation of the measuring-scale to the division-scale for adjusting the computing device with relation to the indicator.

2. In a cheese-cutter, the combination of a cutting mechanism embodying a cutter, a computing device consisting of a gross-value scale, a division-scale, a cheese-measuring scale associated with the division-scale, a divisional-value scale, an indicator coöperating with the divisional-value scale, and means for adjusting the divisional-value scale relative to the indicator as determined by the relation of the measuring-scale and division-scale.

3. In a cheese-cutter, the combination of a cutting mechanism embodying a cutter, a computing device consisting of a gross-value scale, a division-scale, a cheese-measuring scale adjacent the division-scale, a divisional-value scale, an indicator coöperating with the divisional-value scale, and means for adjusting the divisional-value scale with relation to the indicator including an adjusting-scale embodying elements corresponding to the division-scale for positioning the computing device relative to the indicator.

4. In a cheese-cutter, the combination of a cutting mechanism embodying a cutter, an adjustable follower, a computing device comprising a roller having a gross-value scale, a divisional-value scale, and an adjusting-scale thereon, an indicator comprising a pointer coöperating with the divisional-value scale, and a gage device connected with said pointer and actuated by the material operated upon.

5. In a cheese-cutter, the combination of a cutting mechanism comprising a cutter, a follower, a roller provided with a gross-value scale surrounding the same, a division-scale, a cheese-length reference-scale associated with said division-scale, a divisional-value scale embodying spirally-arranged lines having the space therebetween gradually increasing to an ascertained point, an adjusting-scale for the roller composed of elements corresponding with the division-scale, a pointer coöperating with the adjusting-scale, an indicator comprising a spring-actuated rod, a pointer projected from said rod and coöperating with the divisional-value scale, and a gage carried by the spring-actuated rod.

In testimony whereof I affix my signature in presence of two witnesses.

PHILIP S. McCROSKEY.

Witnesses:
J. A. HANSON,
JOHN W. BREED.